(12) United States Patent
Hayakawa et al.

(10) Patent No.: US 9,538,054 B2
(45) Date of Patent: Jan. 3, 2017

(54) VEHICLE-MOUNTED CAMERA DEVICE

(71) Applicant: NISSAN MOTOR CO., LTD., Yokohama-shi, Kanagawa (JP)

(72) Inventors: Yasuhisa Hayakawa, Yokohama (JP); Osamu Fukata, Sagamihara (JP); Takashi Ashiduka, Atsugi (JP); Toshimichi Gokan, Machida (JP); Yonosuke Nishioku, Atsugi (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/416,188

(22) PCT Filed: Jul. 19, 2013

(86) PCT No.: PCT/JP2013/069673
§ 371 (c)(1),
(2) Date: Jan. 21, 2015

(87) PCT Pub. No.: WO2014/017405
PCT Pub. Date: Jan. 30, 2014

(65) Prior Publication Data
US 2015/0296108 A1    Oct. 15, 2015

(30) Foreign Application Priority Data
Jul. 27, 2012  (JP) .................. 2012-166645

(51) Int. Cl.
*H04N 7/18*     (2006.01)
*H04N 5/225*    (2006.01)
(Continued)

(52) U.S. Cl.
CPC ............... *H04N 5/2254* (2013.01); *B60R 1/00* (2013.01); *B60S 1/52* (2013.01); *B60S 1/54* (2013.01);
(Continued)

(58) Field of Classification Search
CPC .. H04N 5/2254; H04N 5/2251; H04N 5/2252; H04N 5/2171; G02B 13/0015; G02B 7/02; G02B 27/0006; G03B 17/08; G03B 17/02; B60R 1/00; B60S 1/54; B60S 1/52
(Continued)

(56) References Cited

U.S. PATENT DOCUMENTS 7,443,596 B1 * 10/2008 Berge .................... B01L 3/5085
264/1.32
2004/0045600 A1 * 3/2004 Hoggard .................. E03B 7/10
137/61

(Continued)

FOREIGN PATENT DOCUMENTS

EP    2873571 A1    5/2015
JP    11-248915 A    9/1999
(Continued)

OTHER PUBLICATIONS

Yang, Sun Choel, et al. "Ultra Precision Machining of the Winston Cone Baffle for Space Observation Camera." Key Engineering Materials. vol. 516. Trans Tech Publications, 2012.*

*Primary Examiner* — Allen Wong
(74) *Attorney, Agent, or Firm* — Young Basile Hanlon & MacFarlane, P.C.

(57) ABSTRACT

A vehicle-mounted camera device that is mounted on a vehicle and captures a surrounding image from which lights are collected by a lens, in which the lens is set so as to have the surface having a contact angle less than or equal to 100°, preferably less than or equal to 60° so that water attached on the surface is made into a form of a film. For this reason, the surface of the lens has high hydrophilicity, and if water droplets are attached when it is raining, the water droplets extend over the surface of the lens to form a water film. Thus, if mud or other attached matter is attached on the surface of the lens, it is possible to remove the attached (Continued)

matter without delay, and it is possible to always keep the surface of the lens in a clean state.

10 Claims, 9 Drawing Sheets

(51) Int. Cl.
| | | |
|---|---|---|
| *G03B 17/02* | (2006.01) | |
| *G02B 27/00* | (2006.01) | |
| *G03B 17/08* | (2006.01) | |
| *B60S 1/52* | (2006.01) | |
| *B60S 1/54* | (2006.01) | |
| *G02B 7/02* | (2006.01) | |
| *B60R 1/00* | (2006.01) | |
| *G02B 13/00* | (2006.01) | |
| *H04N 5/217* | (2011.01) | |

(52) U.S. Cl.
CPC .............. *G02B 7/02* (2013.01); *G02B 13/0015* (2013.01); *G02B 27/0006* (2013.01); *G03B 17/02* (2013.01); *G03B 17/08* (2013.01); *H04N 5/2251* (2013.01); *H04N 5/2252* (2013.01); *H04N 5/2171* (2013.01)

(58) Field of Classification Search
USPC .......................................................... 348/148
See application file for complete search history.

(56) References Cited

U.S. PATENT DOCUMENTS

| | | | |
|---|---|---|---|
| 2006/0110578 A1* | 5/2006 | Kikuchi | C23C 14/028 |
| | | | 428/141 |
| 2011/0073142 A1 | 3/2011 | Hattori et al. | |
| 2011/0180127 A1* | 7/2011 | Wan | B82Y 10/00 |
| | | | 136/252 |
| 2012/0117745 A1 | 5/2012 | Hattori et al. | |
| 2014/0060582 A1* | 3/2014 | Hartranft | B05B 1/06 |
| | | | 134/18 |

FOREIGN PATENT DOCUMENTS

| | | |
|---|---|---|
| JP | 2006-096190 A | 4/2006 |
| JP | 2010-060699 A | 3/2010 |
| JP | 2011-034101 A | 2/2011 |
| JP | 2011-244417 A | 12/2011 |

* cited by examiner

VEHICLE-MOUNTED CAMERA DEVICE

CROSS REFERENCE TO RELATED APPLICATION

The present application claims priority to Japanese Patent Application No. 2012-166645, filed Jul. 27, 2012, incorporated herein in its entirety.

TECHNICAL FIELD

The present invention relates to a vehicle-mounted camera device mounted on a vehicle and capturing surrounding images.

BACKGROUND

In the case of a vehicle-mounted camera, which is mounted at the rear of a vehicle and captures surrounding images to monitor vehicles traveling behind or at the side of the vehicle or obstructions existing in the surroundings of the vehicle, there is a possibility that foreign substances such as mud are attached on a lens serving as an image-capturing surface, for example, during rainy weather. In such a case, the vehicle-mounted camera cannot clearly capture the surrounding image.

In this respect, there is a known technique disclosed, for example, in Japanese Patent Laid-Open Publication No. 2006-96190, which prevents the foreign substances from being attached on the lens surface. In Japanese Patent Laid-Open Publication No. 2006-96190, a film having water repellency is disposed so as to cover the lens surface to prevent water droplets or foreign substances from being attached on the lens surface.

However, the conventional example disclosed in Japanese Patent Laid-Open Publication No. 2006-96190 employs a configuration in which a film having water repellency (film having a large contact angle) is used to prevent attachment of water droplets or foreign substances on the lens surface. Thus, the conventional example does not deal with the foreign substances or water droplets attached on the surface of the film itself, which causes a problem that the film needs to be replaced if the foreign substances or spots of water droplets are left.

SUMMARY

The present invention has been made to solve the conventional problem as described above, and an object of the present invention is to provide a vehicle-mounted camera device capable of clearly capturing surrounding images while preventing attachment of foreign substances on the lens surface without providing any film that protects a lens surface.

In order to achieve the object described above, a vehicle-mounted camera device according to the present application provides a vehicle-mounted camera device that captures a surrounding image from which lights are collected by a lens surface. The vehicle-mounted camera device according to the present application has the surface of the lens surface having a contact angle formed so as to be less than or equal to a predetermined value so that liquid attached on the surface is made into a form of a film, and a water-retaining member that retains the liquid film attached on the lens surface so as not to fall down is provided at at least a lower part of a periphery of the lens surface.

BRIEF DESCRIPTION OF DRAWINGS

FIGS. 4(a) and 4(b) are perspective views each illustrating a configuration of the cleaning device for a vehicle-mounted camera according to the second embodiment of the present invention, in which FIG. 4(a) is a perspective view illustrating the cleaning device according to the second embodiment of the present invention in a state where the device is installed to a camera mounted at the rear portion of a vehicle, and FIG. 4(b) is a diagram illustrating the cleaning device illustrated in FIG. 4(a) when viewed from a direction "A."

FIGS. 6(a) and 6(b) are sectional views each illustrating a distal end portion of a nozzle of the cleaning device for a vehicle-mounted camera according to the second embodiment of the present invention, in which FIG. 6(a) is an exploded view illustrating the distal end portion of the nozzle, and FIG. 6(b) is a sectional view illustrating a portion of a reference sign P1 in FIG. 6(a).

FIGS. 8(a) and 8(b) are diagrams each illustrating a configuration of the cleaning device for a vehicle-mounted camera according to the second embodiment of the present invention, in which FIG. 8(a) is a perspective view illustrating the cleaning device according to the second embodiment of the present invention in a state where the device is installed to a camera mounted at the rear portion of a vehicle, and FIG. 8(b) is a sectional view illustrating a nozzle unit taken along a line D-D illustrated in FIG. 8(a).

DESCRIPTION OF EMBODIMENTS

Herein below, an embodiment according to the present invention will be described with reference to the drawings.

First Embodiment

Figure 1:
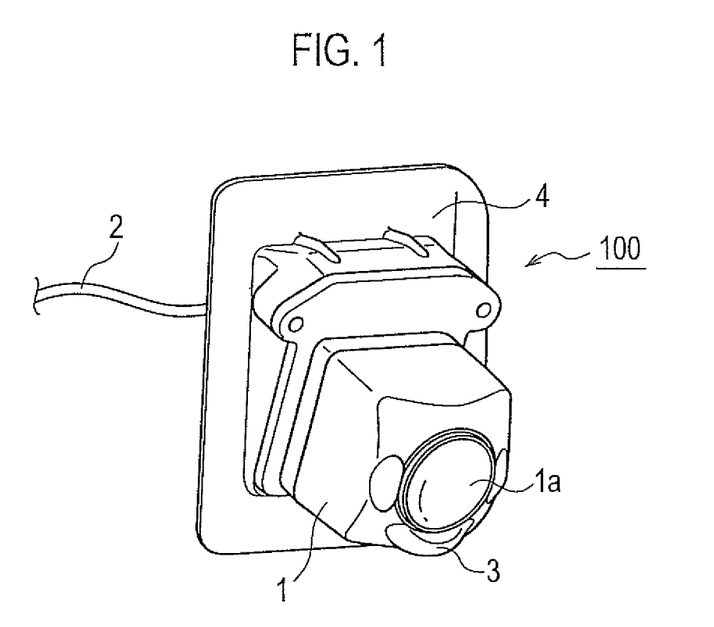
FIG. 1 is a perspective view illustrating a configuration of a vehicle-mounted camera device according to a first embodiment of the present invention.

FIG. 1 is a perspective view illustrating a configuration of a vehicle-mounted camera device according to a first embodiment of the present invention. As illustrated in FIG. 1, the vehicle-mounted camera device 100 is disposed, for example, at an appropriate location of the rear of a vehicle, and captures images of vehicles traveling behind the vehicle to which this device 100 belongs or traveling at the side of this vehicle, or images of objects existing around the vehicle. Furthermore, the vehicle-mounted camera device 100 includes a camera 1 fixed to a plate 4, and a lens 1a provided to the camera 1. The vehicle-mounted camera device 100 converts a surrounding image, from which lights are collected by the lens 1a, into image data, and the converted image data are outputted through a connection line 2 to an image processing device (not illustrated) provided at a stage subsequent thereto.

A water-retaining member 3 is provided below the lens 1a, and when a water film (liquid film) is formed on the surface of the lens 1a, this water-retaining member 3 prevents the water film from falling downward. The water-retaining member 3 has a structure in which the central portion thereof is recessed when viewed from the front, and retains water droplets so as not to fall down from the left side or right side.

Furthermore, the lens 1a is formed such that the contact angle in terms of water repellency is less than 100°, preferably less than 60° on the surface thereof. Thus, the surface of the lens 1a has high hydrophilicity, and if water droplets are attached on the surface of the lens 1a, these water droplets extend over the entire surface of the lens 1a to form a water film. Furthermore, since the water-retaining member 3 exists below the lens 1a, the water film formed on the surface of the lens 1a is kept in a state of a water film without falling down due to the force of gravity.

The contact angle on the surface of the lens 1a is set by using an agent to form a coating on the surface of the lens, and adjusting the thickness of the coating.

Next, operations of the vehicle-mounted camera device 100 according to the first embodiment will be described. When a vehicle travels in the rain, rain water splashes, and is attached on the surface of the lens 1a of the camera 1 of the vehicle. This attached water extends over the entire surface of the lens 1a due to the hydrophilicity of the lens 1a, thereby forming the water film. Furthermore, with the water-retaining member 3 provided, this water film is retained. Thus, even if mud or other attached matter splashed through the travel of the vehicle is attached on the lens 1a, the water film, formed on the surface of the lens 1a, prevents the attached matters from caking on the surface of the lens 1a, and the attached matters are removed. This makes it possible to keep the surface of the lens 1a in a clean state, and prevent dirt from having an effect on images captured by the camera 1, whereby it is possible to always capture clear images.

As described above, in the vehicle-mounted camera device 100 according to the first embodiment of the present invention, the surface of the lens 1a is formed so as to have a reduced contact angle to increase the hydrophilicity, and hence, if rain water or the like is splashed through travel of the vehicle, and is attached on the surface of the lens 1a, this attached water forms a water film over the entire surface of the lens 1a. Thus, if mud of other attached matter is attached on the surface of the lens 1a, it is possible to prevent this attached matter from caking, and remove it without delay. As a result, it is possible to always keep the surface of the lens 1a in a clean state, and acquire data on clear surrounding images.

Furthermore, the water-retaining member 3 is provided below the lens 1a (part of the periphery of the lens 1a), and the water-retaining member 3 is shaped such that the central portion thereof is recessed when viewed from the front. Thus, when the water film is formed on the surface of the lens 1a, the water-retaining member 3 prevents this water film from falling down due to the force of gravity, and it is possible to keep the water film in a state of a water film.

Figure 2:
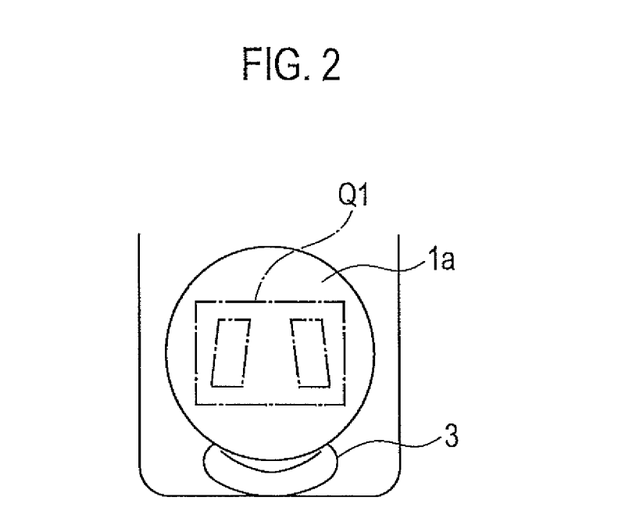
FIG. 2 is an explanatory view schematically illustrating a positional relationship between a lens surface and a water-retaining member provided below the lens surface of the vehicle-mounted camera device according to the first embodiment of the present invention.

It should be noted that the first embodiment described above employs the configuration in which the water-retaining member 3 is provided at a position that covers an entire area below the lens 1a. However, it may be possible that the water-retaining member 3 only covers the area below the image-capturing area of the lens 1a. This configuration will be described with reference to FIG. 2. Of the entire area of the lens 1a, the area used for capturing images is an image-capturing area Q1 located at the center. Thus, it may be possible to employ a configuration in which the water-retaining member 3 is provided so as to only cover the area located below this image-capturing area Q1. In other words, the water-retaining member 3 may protrude and be disposed at a position that covers an area including at least an area located below the image capturing area of the lens 1a. By employing the configuration as described above, it is possible to reduce the size of the water-retaining member 3.

Second Embodiment

Figure 3:
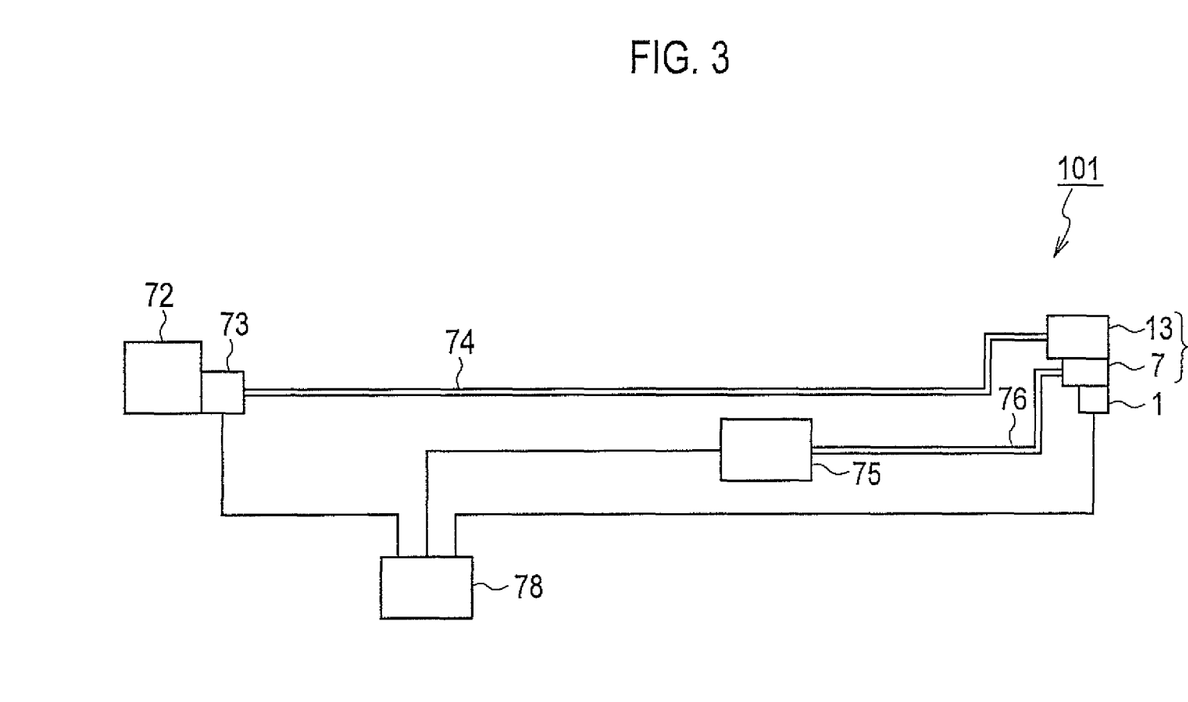
FIG. 3 is a block diagram illustrating a configuration of a cleaning device for a vehicle-mounted camera according to a second embodiment of the present invention.

Next, a second embodiment will be described. FIG. 3 is a block diagram illustrating a configuration of a vehicle-mounted camera device according to the second embodiment of the present invention. As illustrated in FIG. 3, the vehicle-mounted camera device 101 according to the second embodiment includes a liquid reservoir tank 72 that stores liquid such as water and a cleaning liquid, a liquid pump 73 (liquid supply section) that delivers the liquid stored in the liquid reservoir tank 72, an air pump 75 that delivers a compressed air, and a nozzle unit 22 including a secondary tank 13 that stores the liquid delivered by the liquid pump 73, and a nozzle 7 for discharging the liquid toward the lens 1a of the camera 1.

Furthermore, the vehicle-mounted camera device 101 includes a cleaning liquid pipe 74 that guides the liquid delivered by the liquid pump 73 to the secondary tank 13, an air pipe 76 that guides the compressed air delivered by the air pump 75 to the nozzle 7, and a controller 78 (control section) that controls operations of the liquid pump 73 and the air pump 75. The camera 1 is provided, for example, at an appropriate location at the rear of the vehicle to which this camera 1 belongs, and captures images of, for example, vehicles traveling behind or at the side of the vehicle or obstructions.

It should be noted that an example in which a cleaning liquid is used as the liquid discharged from the nozzle 7 will be described below. However, the present invention is not limited to this, and it may be possible to use other liquid such as water. Furthermore, it may be possible to configure the controller 78 as an integral-type computer including, for example, a central processing unit (CPU), and a memory section such as an RAM, a ROM, and a hard disk.

Figure 4A:
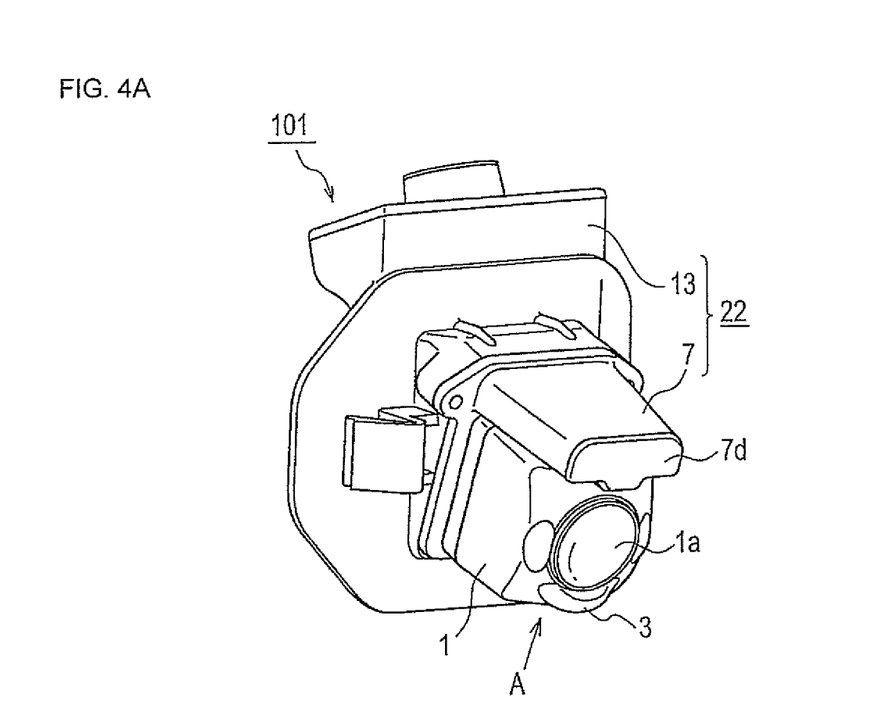
Figure 4B:
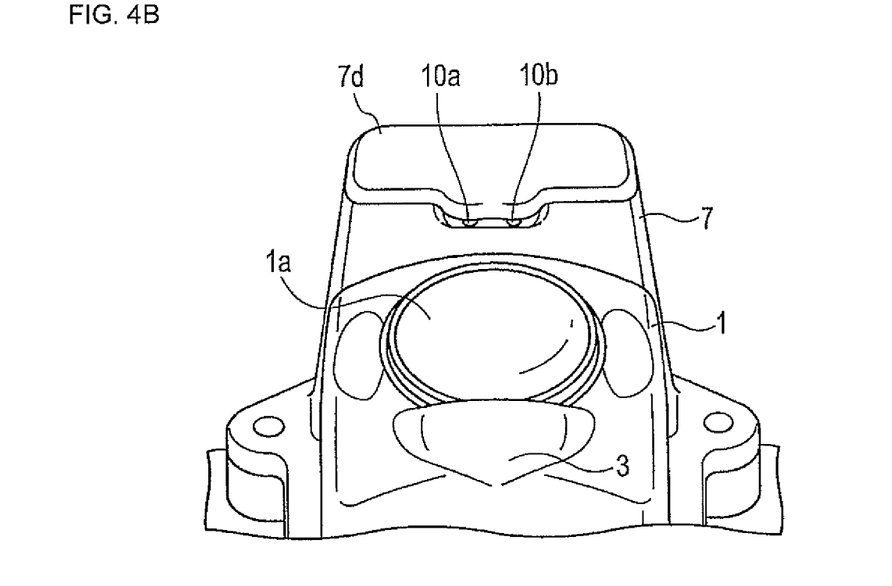

FIG. 4(a) is a perspective view illustrating the configuration of the nozzle unit 22 and the camera 1 of the vehicle-mounted camera device 101 according to the second embodiment of the present invention, and FIG. 4(b) is a diagram when viewed from the direction "A" illustrated in FIG. 4(a). As illustrated in FIG. 4(a), the nozzle unit 22 that supplies the cleaning liquid to the surface of the lens 1a of the camera 1 is provided in the vicinity of the side portion of the camera 1. The nozzle unit 22 is provided with a cap 7d, and the nozzle 7 from which the cleaning liquid and the compressed air are caused to jet toward the lens 1a. As illustrated in FIG. 4(b), the nozzle 7 has the distal end portion provided with two discharge ports 10a and 10b from which the cleaning liquid and the compressed air are caused to jet. More specifically, by jetting the compressed air from the discharge ports 10a and 10b of the nozzle 7 toward the surface of the lens 1a, this compressed air generates negative pressure, and the cleaning liquid is suctioned due to the generated negative pressure, and is caused to jet from the discharge ports 10a and 10b, whereby the cleaning liquid is supplied onto the surface of the lens 1a.

Furthermore, as illustrated in FIG. 4(a) and FIG. 4(b), the water-retaining member 3 for retaining the water film formed on the surface of the lens 1a is provided below the lens 1a, as in the first embodiment described above.

Figure 5:
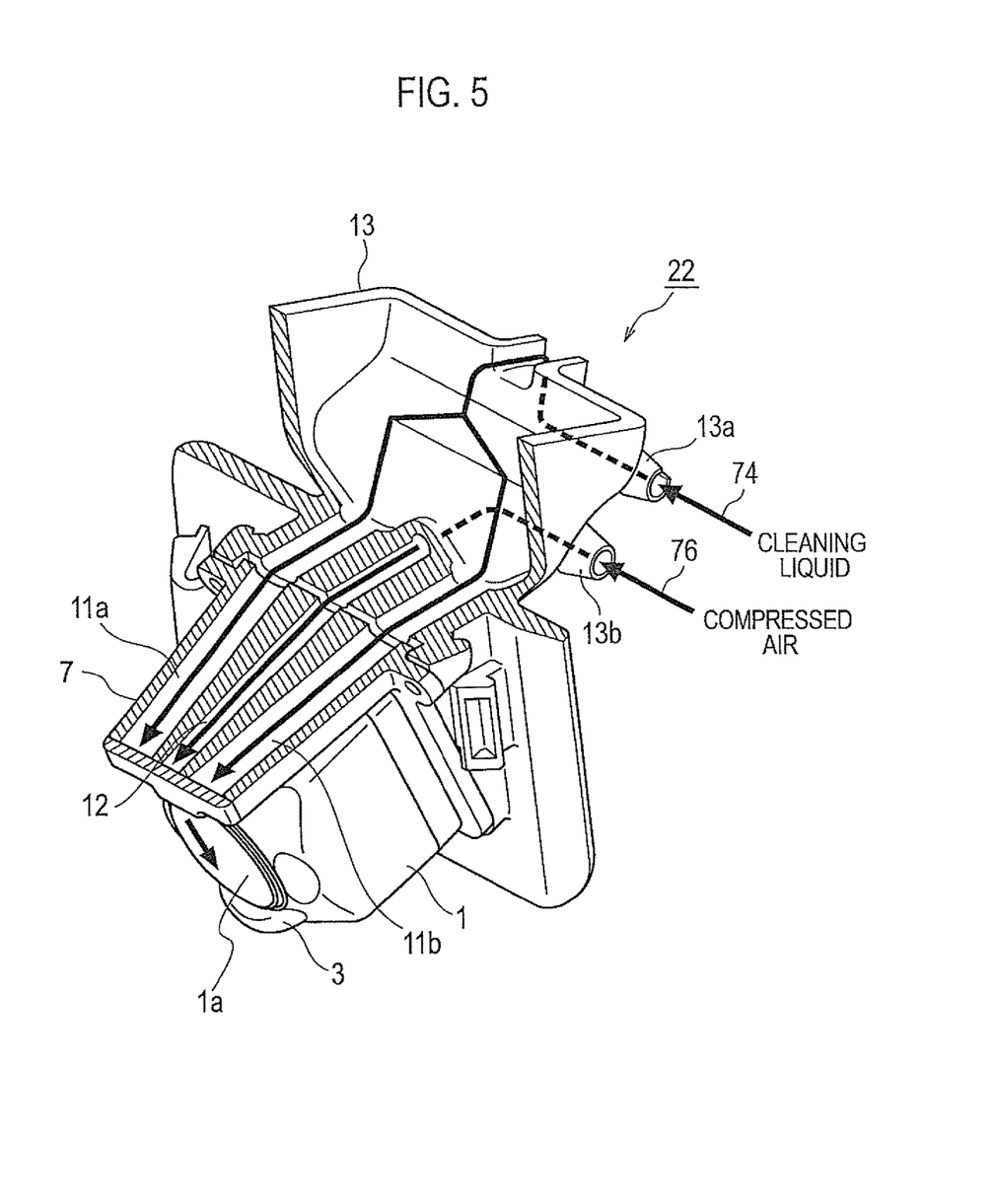
FIG. 5 is a partially-sectioned perspective view illustrating a nozzle unit provided to the cleaning device for a vehicle-mounted camera according to the second embodiment of the present invention.

FIG. 5 is a partially-sectioned perspective view illustrating the nozzle unit 22 illustrated in FIG. 4(a). As illustrated in FIG. 5, the nozzle 7 provided at the distal end side of the nozzle unit 22 has the central portion provided with an air passage 12 that guides the compressed air. Cleaning liquid paths 11a and 11b that guide the cleaning liquid are provided on both sides of the left and the right of the air passage 12. Furthermore, the distal end of each of the air passage 12 and the cleaning liquid paths 11a and 11b is bent at a substantially right angle so as to face the lens 1a of the camera 1.

Furthermore, the secondary tank 13 that temporarily stores the cleaning liquid is provided upstream of the cleaning liquid paths 11a and 11b. On the side portion of this secondary tank 13, a plug 13a for connecting the cleaning liquid pipe 74 and a plug 13b for connecting the air pipe 76 are provided. Of these plugs, the plug 13b is connected with the air passage 12 through a flow path provided below the secondary tank 13. In other words, the compressed air guided through the plug 13b into the nozzle unit 22 is led directly into the air passage 12.

Furthermore, the plug 13a is connected with the secondary tank 13, and the cleaning liquid supplied through this plug 13a is led into the secondary tank 13 from above. In this case, the pipe extending from the plug 13a and connected with the secondary tank 13 is disposed in the vertical direction as indicated by the reference sign 23 in FIG. 8(b). Details of this pipe 23 will be described later.

In addition, as illustrated in FIG. 5, the bottom portion of the secondary tank 13 is connected with two lines of the cleaning liquid paths 11a and 11b. Thus, the compressed air delivered by the air pump 75 illustrated in FIG. 1 is led into the air passage 12 of the nozzle 7 through the air pipe 76, whereas the cleaning liquid delivered by the liquid pump 73 is stored in the secondary tank 13, and then, is led into the two lines of the cleaning liquid paths 11a and 11b.

Figure 6A:
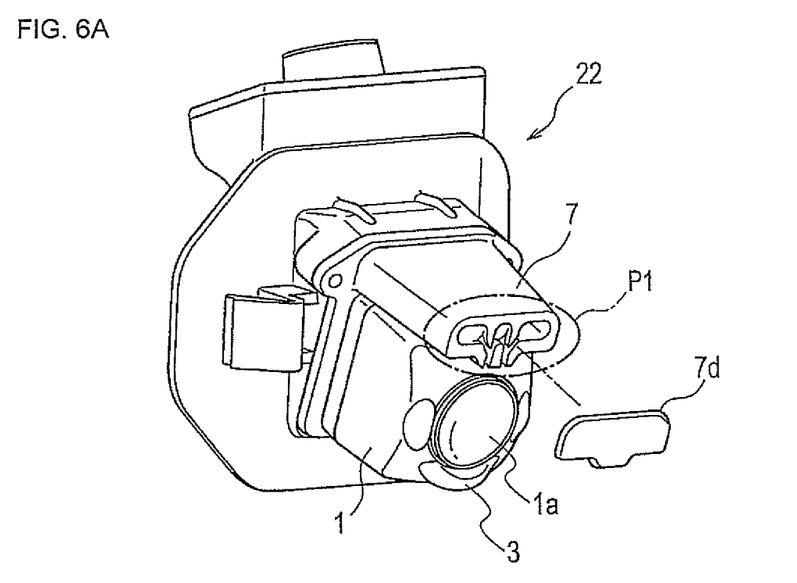
Figure 6B:
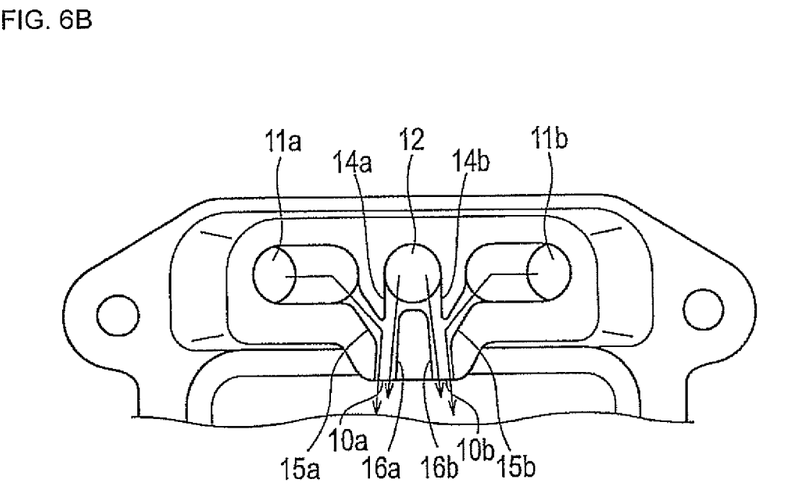

FIG. 6(b) is an explanatory view illustrating a detailed configuration of the distal end portion of the nozzle, and is a sectional view illustrating a portion of a reference sign P1 in FIG. 6(a). As illustrated in FIG. 6(b), the air passage 12 is provided at the center of the distal end portion of the nozzle 7, and two cleaning liquid paths 11a and 11b are provided so as to be located on both sides of the air passage 12.

The cleaning liquid paths 11a and 11b are connected to distal end portions 15a and 15b, respectively. In this case, the area of a flow path of each of the distal end portions 15a and 15b is smaller than the area of a flow path of each of the cleaning liquid paths 11a and 11b. Thus, the speed of the cleaning liquid flowing through each of the cleaning liquid paths 11a and 11b increases when it flows through each of the distal end portions 15a and 15b.

On the other hand, the distal end of the air passage 12 is bifurcated into two distal end portions 14a and 14b. In this case, the area of a flow path of each of the distal end portions 14a and 14b is smaller than the area of a flow path of the air passage 12. Thus, the speed of the compressed air flowing through the air passage 12 increases when it flows through each of the distal end portions 14a and 14b.

Furthermore, the distal end portion 15a of the cleaning liquid path 11a, which is one side, merges with one distal end portion 14a of the air passage 12 to form a merging flow path 16a, the distal end of which forms the discharge port 10a (see FIG. 4(b)). Furthermore, the distal end portion 15b of the cleaning liquid path 11b, which is the other side, merges with the other distal end portion 14b of the air passage 12 to form a merging flow path 16b, the distal end of which forms the discharge port 10b (see FIG. 4(b)). In this case, the merging flow path 16a and the merging flow path 16b are disposed in a manner such that the distance between the two paths increases toward the distal end side thereof.

Figure 7:
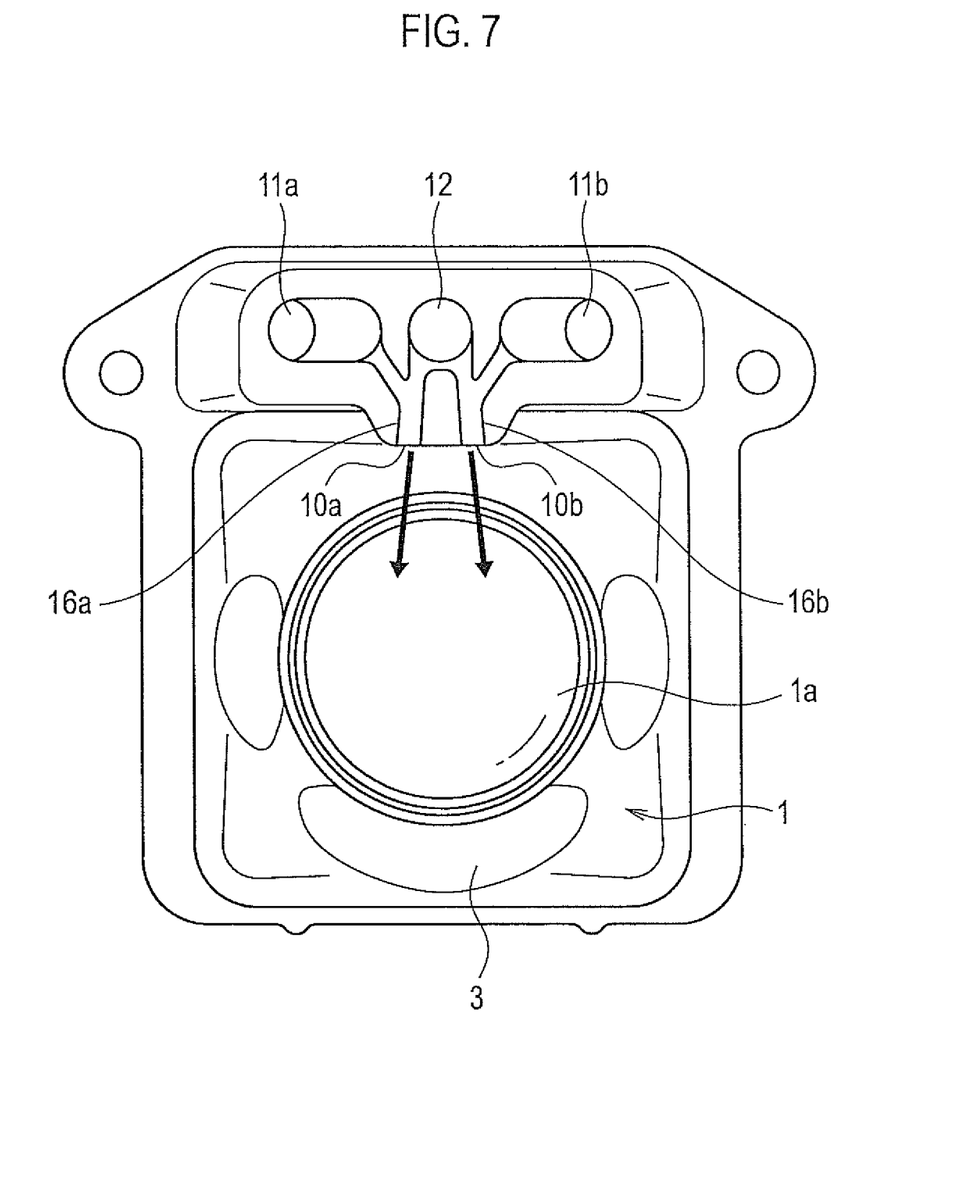
FIG. 7 is an explanatory view illustrating an arrangement relationship between a camera and the distal end portion of the nozzle provided to the cleaning device for a vehicle-mounted camera according to the second embodiment of the present invention.

With this configuration, once the cleaning liquid delivered by the liquid pump 73 illustrated in FIG. 3 is stored in the secondary tank 13, and the compressed air is delivered by the air pump 75, the compressed air jets at an increased speed. With the jet of the compressed air, the cleaning liquid paths 11a and 11b are made into a negative pressure to suction the cleaning liquid stored in the secondary tank 13. Thus, the compressed air and the cleaning liquid pass through the two merging flow paths 16a and 16b, jet from the discharge ports 10a and 10b, and are supplied to the surface of the lens 1a. At this time, the liquid, which is a mixture of the cleaning liquid and the compressed air, jets in a direction that spreads out toward the outside as illustrated in FIG. 7, whereby it is possible to supply the cleaning liquid so as to spread over the entire lens surface 1a.

Figure 8A:
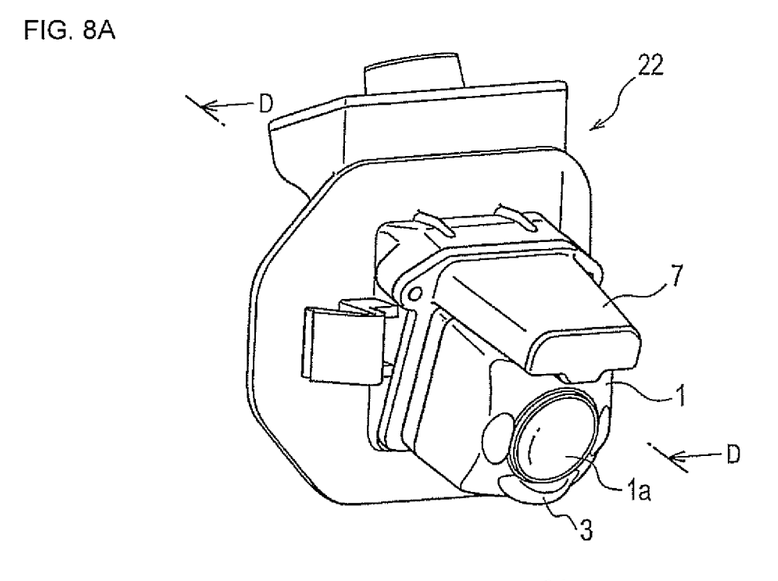
Figure 8B:
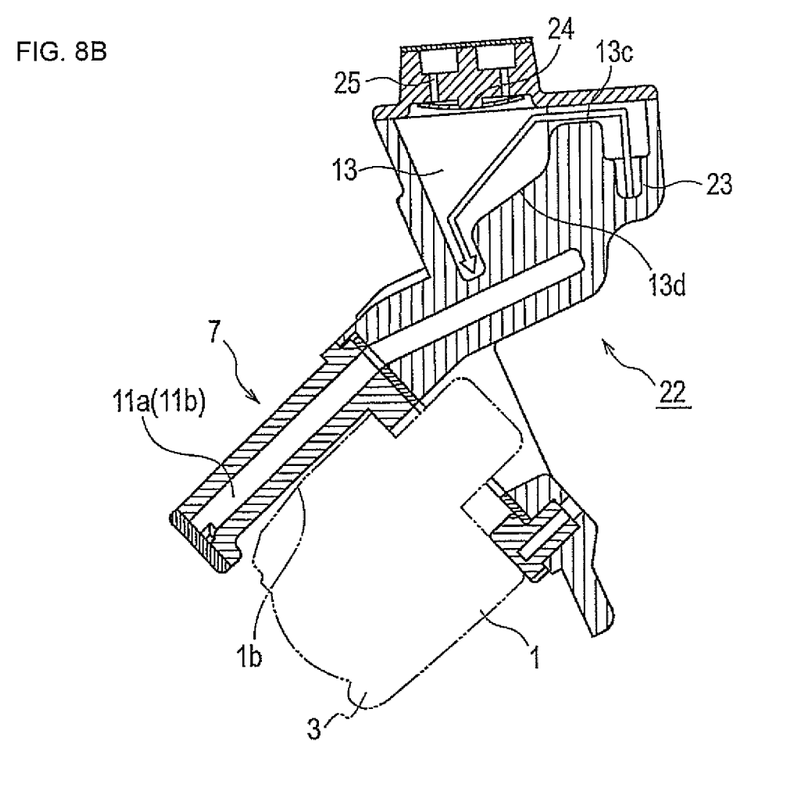

FIG. 8(b) is a sectional view illustrating the nozzle unit 22 illustrated in FIG. 8(a) and taken along the line D-D. As illustrated in FIG. 8(b), a supply port 13c for supplying the cleaning liquid into the secondary tank 13 is provided on the upper part of the secondary tank 13 provided upstream of the nozzle 7, and to this supply port 13c, the pipe 23 placed in the vertical direction is provided. Then, this pipe 23 is connected with the plug 13a illustrated in FIG. 5. With the pipe 23 being placed in the vertical direction, it is possible to prevent the cleaning liquid staying in the pathway from irregularly entering the secondary tank 13 in the case where supply of the cleaning liquid by the liquid pump 73 (see FIG. 3) is stopped. In other words, it is possible to prevent the cleaning liquid from entering the secondary tank 13 due to vibration in a state where the secondary tank 13 is empty.

Furthermore, a check valve 24 is provided on the upper surface of the secondary tank 13. The check valve 24 is, for example, an umbrella valve, and is configured such that, if the pressure within the secondary tank 13 becomes negative pressure, the valve is opened to introduce the outside air through an air vent 25, and if the pressure within the secondary tank 13 becomes positive pressure, the valve is closed to prevent release to the outside.

Furthermore, as illustrated in FIG. 8(b), the bottom surface 13d of the secondary tank 13 is sloped so as to descend toward the front side (left side in the drawing). In addition, an outlet pipe of the secondary tank 13 as well as the cleaning liquid paths 11a and 11b and the air passage 12 (see FIG. 5) provided to the nozzle 7 are similarly configured to be sloped so as to descend toward the front side. With these configurations, the cleaning liquid stored in the secondary tank 13 does not stay in a certain location, and the slope on each of the portions causes the cleaning liquid to reliably flow toward the downstream side.

In addition, as in the first embodiment described above, the camera 1 according to the second embodiment has the water-retaining member 3 provided below the lens 1a. Furthermore, the surface of the lens 1a is processed so that the contact angle is less than 100°, preferably less than 60°. Thus, the surface of the lens 1a has high hydrophilicity, and when the cleaning liquid is supplied from the nozzle 7, the water film is formed on the surface of the lens 1a. This water film is retained by the water-retaining member 3, and does not fall downward. For this reason, if attached matter is attached on the surface of the lens 1a, this water film prevents the attached matter from caking, and the attached matter is removed, whereby it is possible to always keep the surface of the lens 1a in a clean state.

Figure 9:
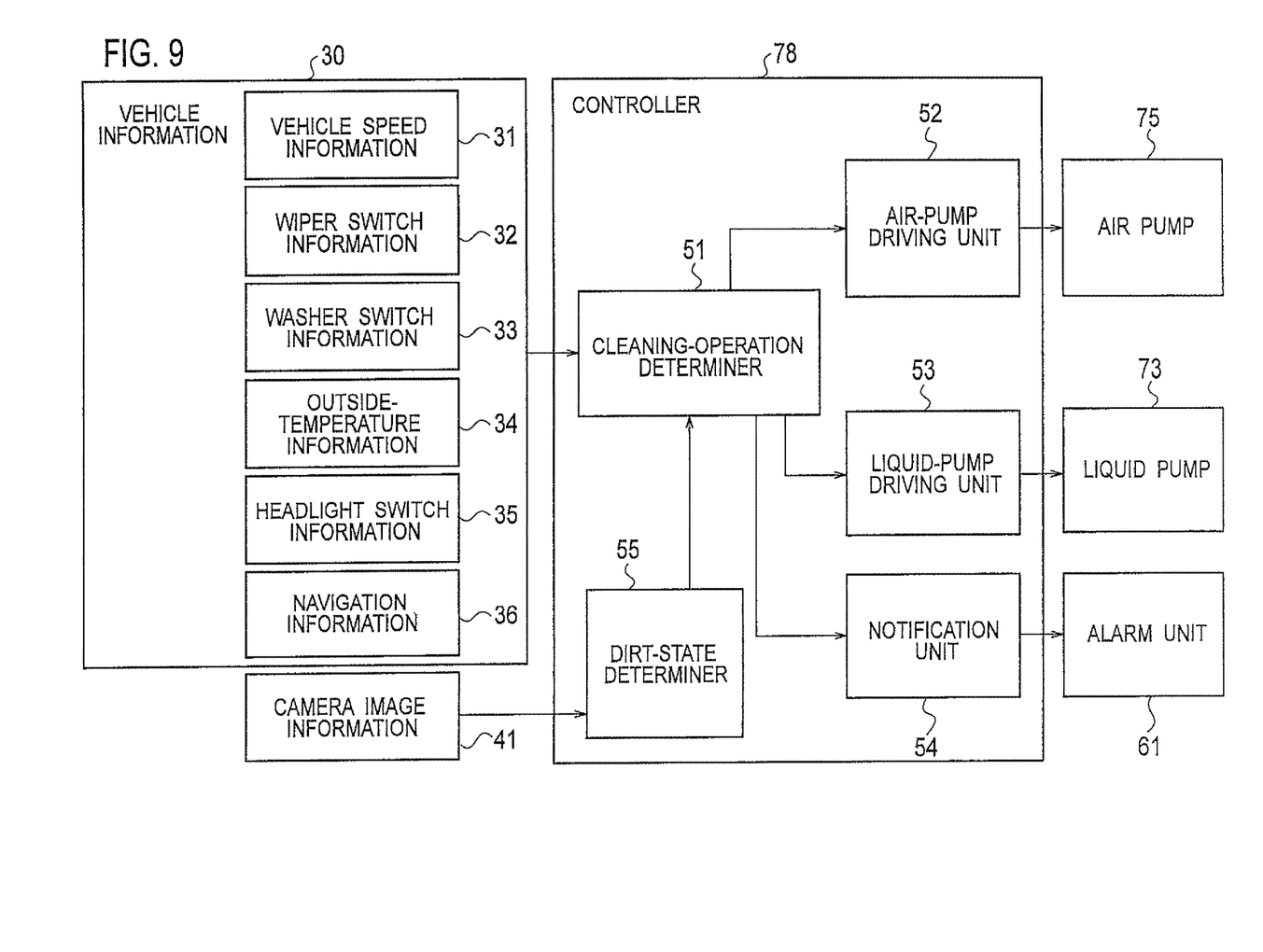
FIG. 9 is a block diagram illustrating a detailed configuration of a controller of a device of the vehicle-mounted camera according to the second embodiment of the present invention.

Next, detailed configuration of a controller 78 (control section) illustrated in FIG. 3 will be described with reference to the block diagram illustrated in FIG. 9. As illustrated in FIG. 9, the controller 78 is connected with a control unit provided to a vehicle, and acquires various pieces of vehicle information 30 including vehicle speed information 31, wiper switch information 32, washer switch information 33, outside-temperature information 34, headlight switch information 35, and navigation information 36. The controller 78 further acquires camera image information 41, which is an image captured by the camera 1.

Furthermore, the controller 78 includes a dirt-state determiner 55 that determines, based on the camera image information 41, whether the lens surface 1a of the camera 1 gets dirty, and a cleaning-operation determiner 51 that determines, based on the various pieces of the vehicle information 30, whether to supply the cleaning liquid to the surface of the lens 1a. In addition, the controller 78 includes an air-pump driving unit 52 that controls the operation of the air pump 75 based on the control signal from the cleaning-operation determiner 51, a liquid-pump driving unit 53 that controls the operation of the liquid pump 73, and a notification unit 54 that outputs a notification signal when abnormal occurs in the operation of supplying the cleaning liquid. Moreover, the controller 78 is connected with an alarm unit 61 that notifies occurrence of alarm when the notification unit 54 outputs the notification signal.

The cleaning-operation determiner 51 sets intervals of time for supplying the cleaning liquid to the surface of the lens 1a based on the various pieces of the vehicle information 30, and information on dirt of the camera 1, and furthermore, outputs the control signal to the air-pump driving unit 52 and the liquid-pump driving unit 53 so as to supply the cleaning liquid at the set intervals of time.

Figure 10:
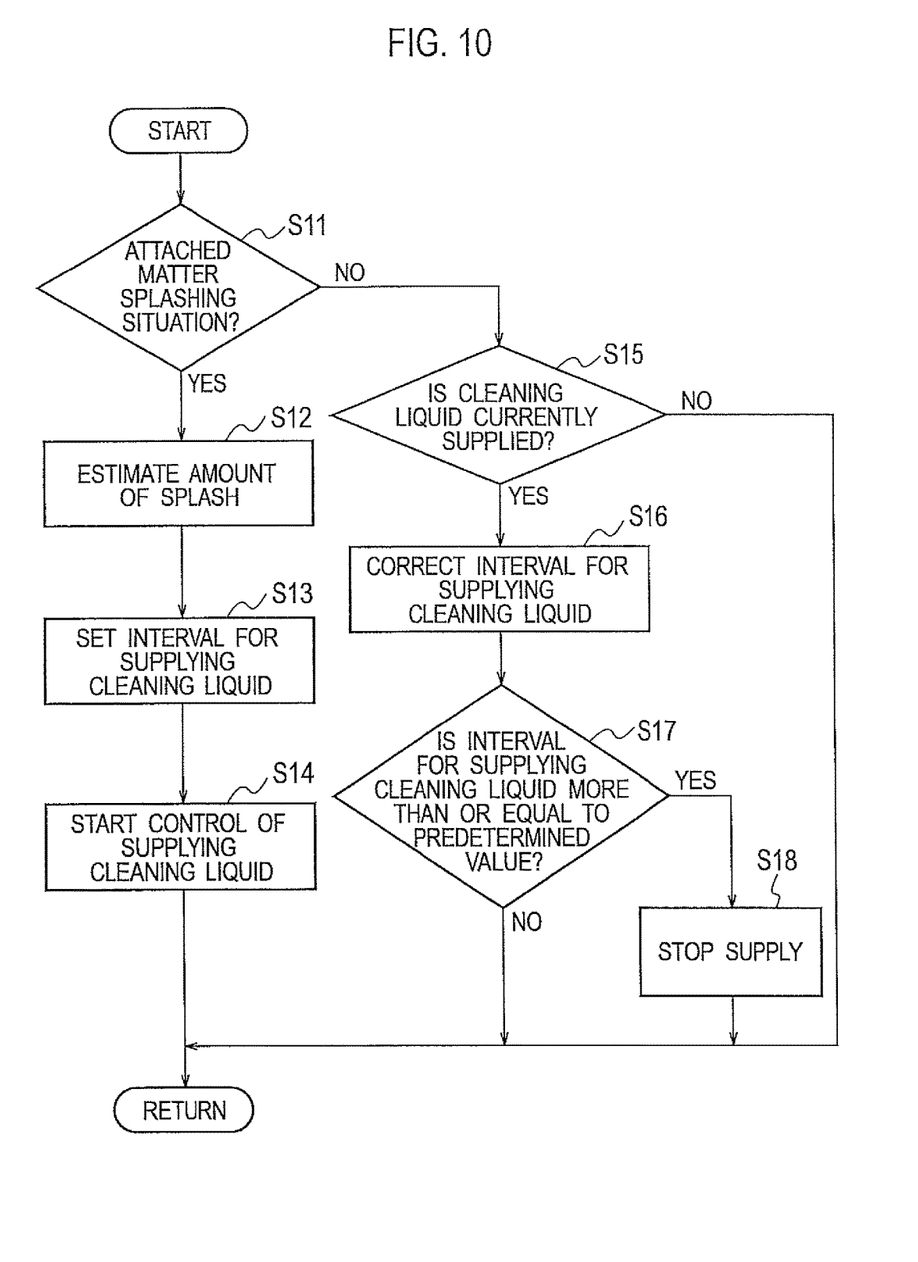
FIG. 10 is a flowchart showing process procedures performed by the device of the vehicle-mounted camera according to the second embodiment of the present invention.

Next, operations of the vehicle-mounted camera device 101 according to the second embodiment having the configuration as described above will be described with reference to the flowchart shown in FIG. 10. FIG. 10 shows process procedures performed by the controller 78, which are performed for each predetermined calculation cycle.

First, in step S11, the controller 78 determines whether the surrounding environment where the vehicle currently travels is a situation where splash of mud or other attached matters occurs. More specifically, the controller 78 determines, based on the wiper switch information 32 and the washer switch information 33, whether it is raining, and if it is raining, it is determined that the vehicle currently travels in the splashing situation. If the controller 78 determines, based on the navigation information 36, that the vehicle currently travels on rough ground, it is determined that the vehicle currently travels in the splashing situation. Then, if it is determined that it is in the splashing situation, the process proceeds to step S12, and if not, the process proceeds to step S15.

In step S12, the controller 78 estimates the amount of attached matter splashed. For example, based on the navigation information 36, it is determined that the amount of attached matter splashed is large if the vehicle is traveling on rough ground. Furthermore, based on the wiper switch information 32, it is determined that the amount of splash is large if the wiper is operating at a high speed or if the integral time of wiper is long. Furthermore, based on the washer switch information 33, it is determined that the amount of splash is large if the washer is operating. Furthermore, based on the dirt state of the surface of the lens 1a detected by the dirt-state determiner 55 illustrated in FIG. 9, it is determined that the amount of splash is large if a large amount of dirt occurs.

In step S13, the controller 78 sets the interval of time for intermittently supplying the cleaning liquid from the nozzle 7 and the amount of supply for each supply. More specifically, based on the amount of attached matter splashed, which is estimated in the process of step S12, if the amount of attached matter splashed is estimated to be large, the intervals of time for intermittently supplying the cleaning liquid is set to be short, or the amount of the cleaning liquid supplied for each supply is set to be large. Furthermore, based on the vehicle speed information 31, if the vehicle travels at a predetermined speed or faster, the interval of time for supplying the cleaning liquid is set to be short, or the amount of the cleaning liquid supplied for each supply is set to be large. Moreover, based on the headlight switch information 35, during night time, the interval of time for supplying the cleaning liquid is set to be short, or the amount of the cleaning liquid supplied for each supply is set to be large.

In step S14, the controller 78 outputs a drive instruction from the air-pump driving unit 52 and the liquid-pump driving unit 53 to drive the air pump 75 and the liquid pump 73. With this operation, the cleaning liquid is stored in the secondary tank 13 illustrated in FIG. 5, and the compressed air flows through the air passage 12, so that the cleaning liquid in the secondary tank 13 is suctioned, and is caused to jet from the merging flow paths 16a and 16b illustrated in FIG. 6(b). Thus, it is possible to supply the cleaning liquid to the surface of the lens 1a of the camera 1.

Then, the cleaning liquid supplied to the surface of the lens 1a forms a water film on the surface of the lens 1a, since the surface of the lens 1a has high hydrophilicity. Moreover, since the water-retaining member 3 prevents this water film from falling down, the water film formed on the surface of the lens 1a is maintained. Thus, even if travel of a vehicle causes mud or other attached matter to splash, and the attached matter is attached on the lens 1a of the vehicle, it is possible to prevent the attached matter from caking on the surface of the lens 1a.

Furthermore, in the process of step S14, based on the outside-temperature information (information on ambient temperatures around the vehicle) illustrated in FIG. 9, if the outside temperature (ambient temperature) is lower than or equal to a predetermined temperature (for example, minus 20° C.) set in advance, supply of the cleaning liquid is stopped. In other words, if the outside temperature is low, the cleaning liquid freezes on the surface of the lens 1a, possibly making images unclear. To prevent this, supply of the cleaning liquid is stopped.

On the other hand, if the situation is not a situation where attached matter splashes (NO in step S11), the controller 78 determines in step S15 whether the cleaning liquid is currently supplied. Then, if it is determined that the cleaning liquid is not being supplied (NO in step S15), the processing ends.

Furthermore, if it is determined that the cleaning liquid is being supplied (YES in step S15), the controller 78 corrects, in step S16, the interval for supplying the cleaning liquid. More specifically, the interval for supplying the cleaning liquid set in the process of step S13 is set so as to be gradually increased. This means that, if it is not in a situation where attached matter splashes (NO in step S11), the surface of the lens 1*a* is less likely to be contaminated with mud or other attached matter even if the amount of the cleaning liquid supplied is decreased, and hence, the interval for supplying the cleaning liquid is corrected so as to be increased (in a manner such that the amount of the cleaning liquid supplied is decreased).

In step S17, the controller 78 determines whether the interval for supplying the cleaning liquid is longer than or equal to a predetermined value. If the interval is less than the predetermined value (NO in step S17), this processing ends, whereas, if the interval is longer than or equal to the predetermined value (YES in step S17), supply of cleaning liquid is stopped in step S18.

As described above, since the vehicle-mounted camera device 101 according to the second embodiment intermittently supplies the cleaning liquid toward the surface of the lens 1*a* from the nozzle 7, it is possible to form the water film (liquid film) on the surface of the lens 1*a* having high hydrophilicity, and furthermore, with the water-retaining member 3 provided below the lens 1*a*, it is possible to prevent this water film from falling down. Thus, it is possible to keep the surface of the lens 1*a* in a state where the water film is formed thereon, and even in the case where mud or other attached matter splashed during rainy weather is attached on the surface of the lens 1*a*, it is possible to remove this attached matter without delay, whereby it is possible to always keep the surface of the lens 1*a* in a clean state.

Furthermore, in the case of a system in which water repellency is increased to remove water, as in the conventional technique, spots of water droplets are left after the water droplets formed on the surface of the lens evaporate, which leads to a drawback that clear images cannot be obtained. On the other hand, with the present invention, such a problem does not occur, and it is possible to obtain clear images.

Furthermore, in the second embodiment, the amount of attached matter splashed is estimated. In the case where the amount of splash is estimated to be large, the interval of time for supplying the cleaning liquid is set to be short, or the amount of cleaning liquid supplied for each supply is set to be large. Thus, in the situation where a large amount of mud or other attached matter splashes during, for example, travel on rough ground, the frequency of supply of the cleaning liquid is increased, and hence, it is possible to more reliably prevent the surface of the lens 1*a* from being contaminated.

In addition, if the ambient temperature is less than or equal to a predetermined temperature (for example, minus 20° C.), supply of the cleaning liquid is stopped. This makes it possible to prevent the cleaning liquid from freezing on the surface of the lens 1*a*, and to prevent images captured by the camera 1 from becoming unclear.

These are descriptions of the vehicle-mounted camera device according to the present invention based on the embodiments illustrated. However, the present invention is not limited to those described above, and it may be possible to replace the configuration of each unit with any given configuration that has a similar function.

According to the vehicle-mounted camera device according to the present invention, once water is attached on the lens surface, a water film is formed on the lens surface because of hydrophilicity of the lens, and hence, if dirt is attached, it is possible to remove this dirt without delay, and it is possible to always keep the lens surface in a clean state without providing any film thereto. Thus, this vehicle-mounted camera device can be used to prevent dirt from being attached on the lens surface of the camera mounted on a vehicle.

The invention claimed is:

1. A vehicle-mounted camera device that captures a surrounding image, comprising:
    a lens comprising a hydrophilic lens surface convexly extending from a camera housing in a first direction and formed so that liquid attached on the lens surface forms a liquid film; and
    a water-retaining member extending from the camera housing in the first direction in a position along a lower edge of only a portion of a circumference of the lens surface, the water-retaining member comprising a recess in a surface of the water-retaining member facing the lens, the recess configured to retain the liquid film formed on the lens surface.

2. The vehicle-mounted camera device according to claim 1, wherein the water-retaining member extends from and is disposed at the position on the camera housing that covers an area including an area located below an image-capturing area of the lens surface.

3. The vehicle-mounted camera device according to claim 2, wherein the recess extends in a downward direction when viewed from a front of the lens surface.

4. The vehicle-mounted camera device according to claim 1, further comprising:
    a nozzle that supplies liquid toward the lens surface;
    a liquid supply section that supplies the liquid to the nozzle; and
    a control section that controls the liquid supplied from the liquid supply section to the lens surface at a desired timing.

5. The vehicle-mounted camera device according to claim 4, wherein
    the control section controls such that the liquid is intermittently supplied from the liquid supply section to the lens surface, and
    the control section estimates an amount of attached matter splashed on the lens surface based on vehicle information, and changes at least one of an interval of time for intermittently supplying the liquid and an amount of liquid supplied for each supply, according to the estimated amount of attached matter splashed.

6. The vehicle-mounted camera device according to claim 4, wherein the control section acquires information on an ambient temperature of a vehicle to which the vehicle-mounted camera device belongs, based on vehicle information, and stops supply of the liquid, if the ambient temperature is less than or equal to a predetermined temperature.

7. The vehicle-mounted camera device according to claim 1, further comprising a coating formed, with an agent, on the surface of the lens surface, wherein a contact angle of the lens surface is adjusted by adjusting a thickness of the coating.

8. The vehicle-mounted camera device according to claim 1, further comprising:

a nozzle that supplies liquid toward the lens surface, wherein nozzle extends from the camera housing on an opposite side of the lens from the water-retaining member.

9. The vehicle-mounted camera device according to claim 8, wherein the lens is positioned between the recess and the nozzle.

10. A vehicle-mounted camera device that captures a surrounding image from which lights are collected by a lens surface, comprising:
   a lens surface formed so as to have a surface having a contact angle less than or equal to a predetermined value so that liquid attached on the surface is made into a form of a film;
   a coating formed, with an agent, on the surface of the lens surface, wherein a contact angle of the lens surface is adjusted by adjusting a thickness of the coating;
   a water-retaining member provided along a lower edge of the lens surface in a protruding manner and retaining a liquid film formed on the lens surface so as to stay on the surface of the lens surface;
   a nozzle that supplies liquid toward the lens surface;
   a liquid supply section that supplies the liquid to the nozzle; and
   a control section that controls the liquid supplied from the liquid supply section to the lens surface at a desired timing.

* * * * *